United States Patent [19]
Leitz et al.

[11] Patent Number: 4,819,776
[45] Date of Patent: Apr. 11, 1989

[54] ROLLER CAGE FOR OVERRUNNING CLUTCHES

[75] Inventors: Hermann Leitz; Herbert Moser, both of Heidelberg, Fed. Rep. of Germany

[73] Assignee: Borg-Warner Automotive, Inc., Troy, Mich.

[21] Appl. No.: 87,061

[22] Filed: Aug. 19, 1987

Related U.S. Application Data

[63] Continuation of Ser. No. 869,763, Jun. 2, 1986, abandoned.

[30] Foreign Application Priority Data

Jun. 3, 1985 [DE] Fed. Rep. of Germany ....... 3519812

[51] Int. Cl.⁴ ...................... F16D 15/00; F16D 41/06
[52] U.S. Cl. .................................... 192/45; 192/41 R
[58] Field of Search .................. 192/45.1, 41 R, 41 A, 192/45

[56] References Cited

U.S. PATENT DOCUMENTS

| | | | |
|---|---|---|---|
| 2,753,027 | 7/1956 | Troendly et al. | 192/45.1 |
| 3,055,472 | 9/1962 | Sauzedde | 192/45 |
| 3,166,169 | 1/1965 | Wade et al. | 192/45 |
| 3,184,020 | 5/1965 | Benson et al. | 192/45 |
| 3,219,163 | 11/1965 | Zlotek | 192/45.1 |
| 3,339,687 | 9/1967 | Cowles | 192/45 |
| 3,404,760 | 10/1968 | Benson et al. | 192/45 |
| 3,537,555 | 11/1970 | Reister et al. | 192/45 |
| 3,598,212 | 8/1971 | Giese | 192/41 A X |
| 3,937,312 | 2/1976 | Gehrke | 192/45 |
| 4,114,739 | 9/1978 | Colonna et al. | 192/41 A |
| 4,252,221 | 2/1981 | Lanzerath et al. | 192/41 A |
| 4,422,537 | 12/1983 | Ritter | 192/45 |
| 4,522,289 | 6/1985 | Giese et al. | 192/41 A |
| 4,555,002 | 11/1985 | Baker | 192/45 |

FOREIGN PATENT DOCUMENTS 2155419 5/1973 Fed. Rep. of Germany.
2344960 4/1975 Fed. Rep. of Germany.

*Primary Examiner*—Rodney H. Bonck
*Attorney, Agent, or Firm*—Robert L. Zieg; James J. Jennings; James A. Geppert

[57] ABSTRACT

A cage for a clutch roller in an overrunning clutch having a side plate and crossbars extending therefrom parallel to the axis of the cage, complemented by a side ring spaced from the side plate which is bonded integrally to the ends of the crossbars. As a result of this, one obtains a cage with high stability that can be simply produced.

11 Claims, 3 Drawing Sheets

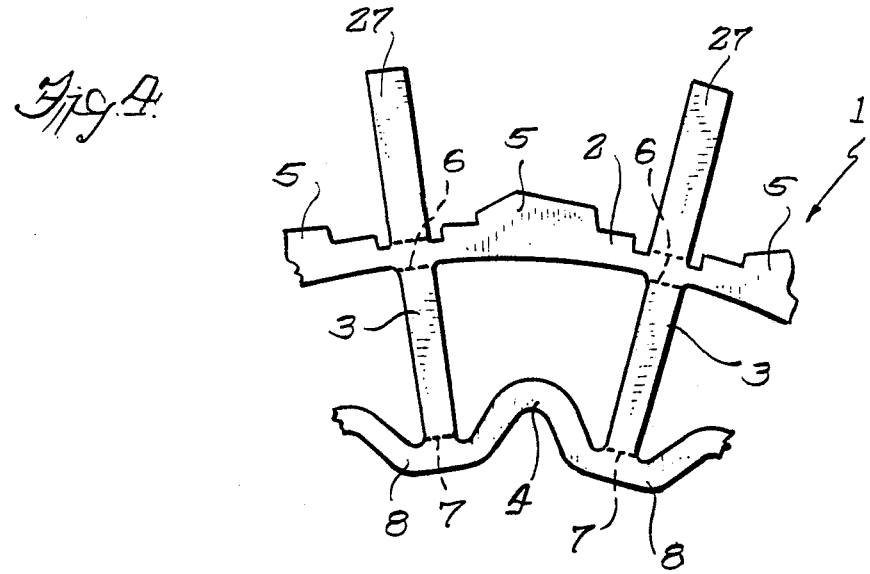
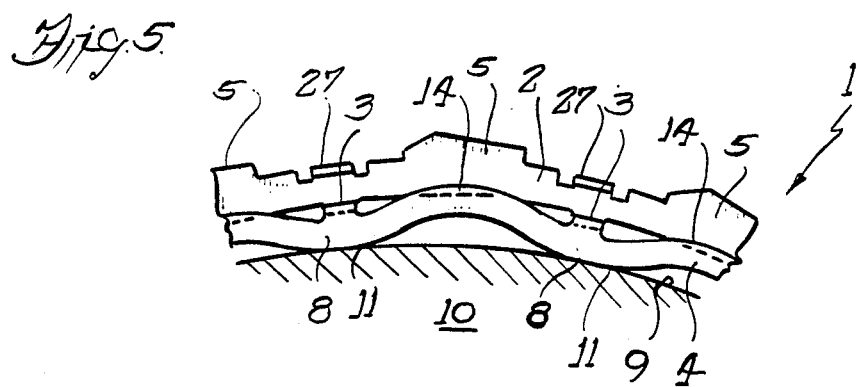
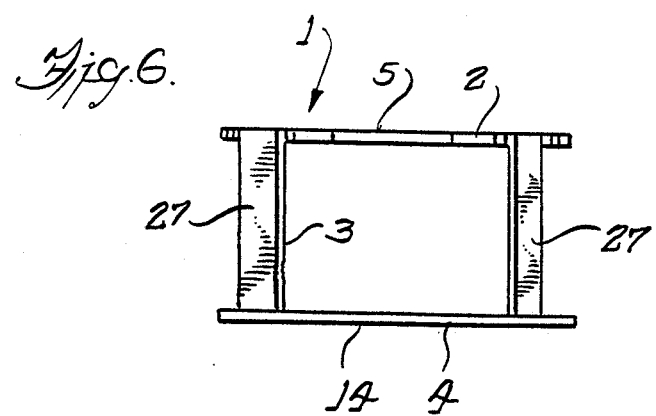

ROLLER CAGE FOR OVERRUNNING CLUTCHES

This is a continuation of application Ser. No. 869,763, filed June 2, 1986, and now abandoned.

BACKGROUND OF THE INVENTION

The present invention is concerned with a roller cage for overrunning clutches, the cage having a ring-shaped side disk with crossbars extending parallel to the cage axis and a folding or accordion spring corresponding to each clutch roller.

Cages of this type have been known, for example, from German Pat. No. 23 44 960. Crossbars project from the side disk in these cages, with the crossbars having a base at their end for supporting the roller. There are additional crossbars provided which serve to support the folding or accordion springs. The stiffness of these cages is not satisfactory in all cases, and the lack of a second side disk is also a disadvantage for the cage.

Cages that are manufactured from pressed plate parts and have two side disks with axial connecting bars produced separately therefrom have a higher torsional strength. The production of such cages is considerably more expensive. Therefore, the task of the present invention is to provide a roller cage for overrunning clutches, in which the above mentioned disadvantages are avoided, that is, the cage should have high stability and should be able to be produced simply and economically.

SUMMARY OF THE INVENTION

According to the present invention, in the case of a cage of the type mentioned at the outset, the above task is solved by using a side ring which is formed integrally with the ends of the crossbars on the opposite end of the cage from the side disk. As a result of this solution, the simple manner of construction of the cage can be retained, which resides in the fact that the entire cage is punched out of sheet metal and receives its shape by bending of its parts. However, at the same time, a very stable side ring is introduced which imparts an extraordinarily high stability to the cage. This side ring is comparable to the second side disk in cages which are put together from separate side disks and crossbars. In this case, however, the side ring is bound integrally to the ends of the crossbars. This integral bond is also provided for the ring-shaped side disk on the opposite side of the cage.

This one side disk is provided with projections that can be introduced into the camming ramps of a clutch race, as a result of which their position is fixed in the clutch race. The clutch race may be an inner or outer ring, depending on the position of the camming ramps in the inner or outer ring.

On the other hand, the shape of the side ring is wavy. This wavy form is introduced during the punching operation and is substantially retained in the flattened form even after the cage parts are bent. However, they are considerably flattened in comparison to their original shape.

The side ring may contact the outside surface of the clutch shaft, with its parts that face either the cylindrical surface of the outer clutch race or face the clutch shaft, but this is predominantly the case for parts that are directed toward the inside. This provides an additional centering of the cage. Considering what has been said above, the projections of the side disk are inserted into the camming ramps, while the radially protruding parts of the side ring touch the respective outside surface of the clutch ring or clutch shaft. It is favorable when the inside surfaces of the radially projecting parts of the side ring have a shape which is adapted to the clutch ring or clutch shaft by having a radius which corresponds to the clutch ring or clutch shaft. As a result of this, the contact area will be increased considerably and individual pressure points are avoided.

Preferably, the crossbars are arranged parallel to the axis of the cage. However, in another mode of execution of the invention, it is also possible to design the side ring by corresponding selection of the wave form of the side ring and possibly by a slight tilting of the crossbar, so that the radially protruding wave parts lie against the clutch ring as well as against the clutch race. The part of the wave form that meshes with the camming ramp surfaces is to be adapted correspondingly to the shape of the inclined or wedging ramp.

It is favorable when the crossbar extends from the bottom of the side disk and from the top of the side ring. Furthermore, in this case, it is expedient when the crossbars lie between the projections of the side disk and the valleys of the wave forms of the side ring.

The number of projections and waves is chosen to be equal so that a projection and a wave are assigned to each roller.

The cage is equipped with folding or accordion springs, which can be clipped onto the crossbars. In addition to the crossbars, on which the springs are clipped, the cage may be provided with additional crossbars. These crossbars are arranged as the previous crossbars, between the projections of the side disk; namely, on the top of the side disk. Two crossbars together provide a support for a roller, into which the roller is pressed by the spring.

The cage is produced in a manner known in the art by punching the design of the cage from a plate strip and bending the side disk and the side ring in the region where the crossbars end.

DESCRIPTION OF THE DRAWINGS

The following are shown:

FIG. 4 is a portion of an alternate form of the cage with additional crossbars after the punching process.

FIG. 5 is a portion of the cage according to FIG. 4 after bending.

FIG. 6 is a top plan view of a portion of the cage, according to FIG. 5.

DESCRIPTION OF THE PREFERRED EMBODIMENTS

Figure 1:
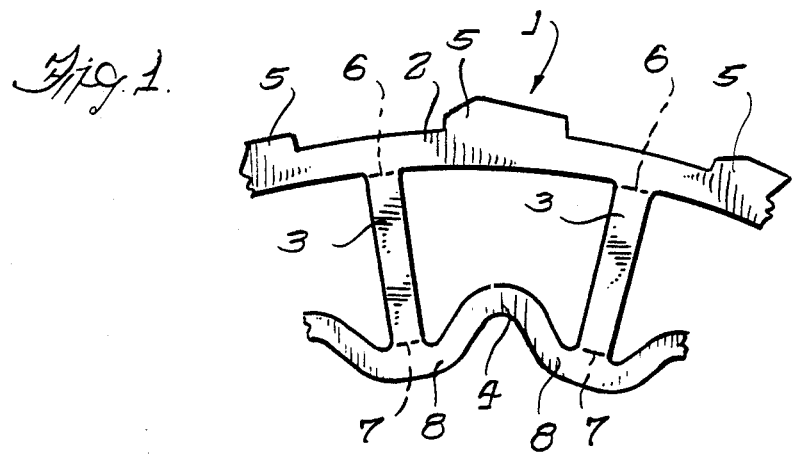
FIG. 1 is a portion of the punched-out cage before the forming process.

FIG. 1 shows a portion of cage 1 after the punching process. Cage 1 consists substantially of a side plate 2 with crossbars 3 and a side ring 4. The side plate 2 has projections 5, the shape of which corresponds to the inclined ramps or cams of the outer clutch ring or race and which can be introduced into these inclined ramps. The side ring 4 has a wavy form. Side ring 4 and side plate 2 are integrally joined by the crossbars 3.

The crossbar ends 6 and 7 are shown with a dashed line. As the punched cage is further shaped, the side plate 2 and side ring 4 are bent around the crossbar ends shown with the dashed line; namely, looking at the drawing, side plate 2 is bent upward and side ring 4 downward. After the cage is completed, the inward directed parts 8 of the side ring lie against the outside surface 9 of the clutch shaft or inner race 10, as shown in FIG. 2.

Figure 2:
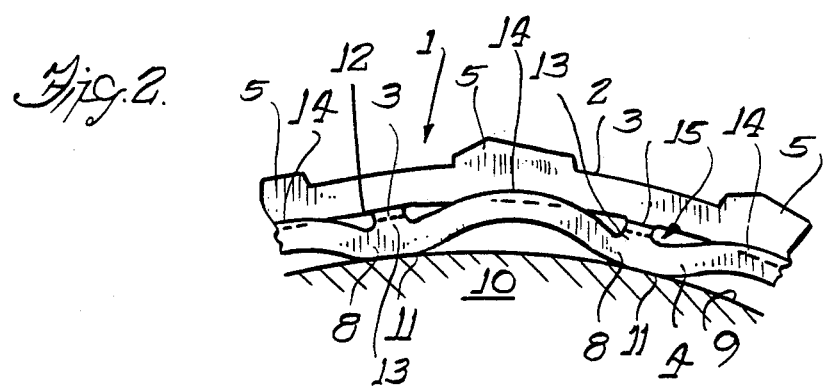
FIG. 2 is a side elevational view of a portion of the cage after the bending process.

FIG. 2 shows a side view of the cage section according to FIG. 1, after side plate 2 and side ring 4 had been bent around crossbar ends 6 and 7. The inside surfaces 11 of parts 8 have been adapted to the shape of the clutch shaft, that is, they have about the same radius as clutch shaft 10. Crossbars 3 run parallel to the axis of the cage, the axis not being specifically shown, starting from the bottom parts 12 of side plate 2 and ending at top part 13 of side ring 4. Projections 5 and the top parts 14 of the waves of the side ring generally correspond to one another so that the inserted clutch rollers are introduced from the side and guided by projections 5 and upper parts 14. Crossbars 3 are about in the middle between projections 5 in the side disk and in the valleys 15 of the waves of side ring 4.

Figure 3:
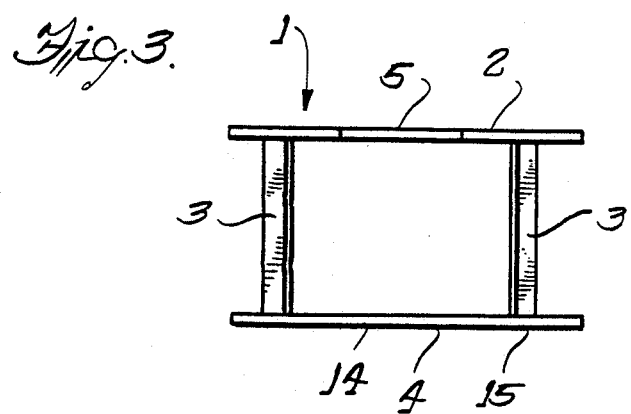
FIG. 3 shows a top plan view of a portion of the cage according to FIG. 2.

FIG. 3 shows a top view of a portion of the cage according to FIG. 2. As can be seen clearly from this, one obtains a cage which substantially consists of side plate 2, side ring 4 and crossbars 3. In contrast to cages that consist of two separate side disks, connected by crossbars, this is a cage in which all three parts are connected integrally, although it was produced by a punching and bending process.

Figure 7:
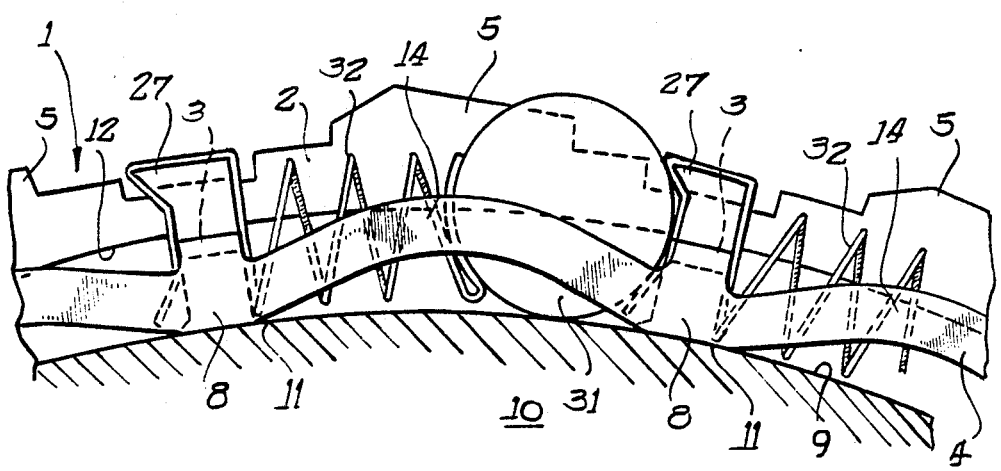
FIG. 7 is a partial side elevational view of the cage of FIG. 4 assembled with rollers and springs.

FIGS. 4, 5 and 6 disclose a cage 1 having substantially the same structure as the cage according to FIGS. 1 to 3. For this reason, the same parts are provided with the same reference numbers. In contrast to the cage described above, the cage according to FIGS. 4 to 6 has additional crossbars 27, which are located at the top part of side plate 2. In the bent position, see FIG. 5, the additional crossbars 27 parallel cross bars 3 to provide support for the clutch rollers. As seen in FIG. 7, the upper and lower crossbars 27 and 3 define pockets for clutch rollers 31 and support for folded springs 32 biasing the rollers. As seen in FIG. 7, the upper and lower crossbars 27 and 3 define pockets for clutch rollers 31 and support for folded springs 32 biasing the rollers.

We claim:

1. A one-piece, seamless metal cage for housing clutch rollers in an overrunning clutch, the cage including an annular side plate having an axis and two opposite faces perpendicular to said axis, a plurality of integral circumferentially spaced crossbars extending parallel to said axis from one face and terminating in free ends, each crossbar adapted to support a folding spring associated with a clutch roller, and an annular side ring having a wavy form and formed integral with and perpendicular to the free ends of said crossbars spaced from and generally parallel to said side plate.

2. A cage according to claim 1, wherein said side plate has radial projections each having an inclined peripheral edge.

3. A cage according to claim 2, wherein said side plate extends radially with bottom and top portions, and said side ring extends radially with top and bottom portions.

4. A cage according to claim 3, wherein said crossbars extend from the bottom portion of the side plate and intersect the top portions of the side ring.

5. A cage according to claim 2, in which said wavy form has peaks and valleys, said crossbars being located between the projections of the side plate and in the valleys of the waves of the side ring.

6. A cage according to claim 5, wherein the side plate projections and the side ring peaks are substantially axially aligned.

7. A cage according to claim 5, in which the number of projections and the number of waves are equal.

8. A cage according to claim 2, including a plurality of additional crossbars integral with said plate and extending parallel to said first mentioned crossbars.

9. A cage according to claim 8, wherein said additional crossbars are located between said projections and radially aligned with said first mentioned crossbars.

10. A cage according to claim 1, wherein an overrunning clutch includes a clutch shaft having an outside surface, and said side ring has inwardly directed parts lying against the outside surface of the clutch shaft.

11. A cage according to claim 1, wherein a folding spring is clipped onto a crossbar of the cage.

* * * * *